D. C. MITCHELL.
TRAIN PIPE VALVE.
APPLICATION FILED NOV. 2, 1916.

1,240,472.

Patented Sept. 18, 1917.
2 SHEETS—SHEET 1.

Inventor
D. C. Mitchell

By
Attorneys.

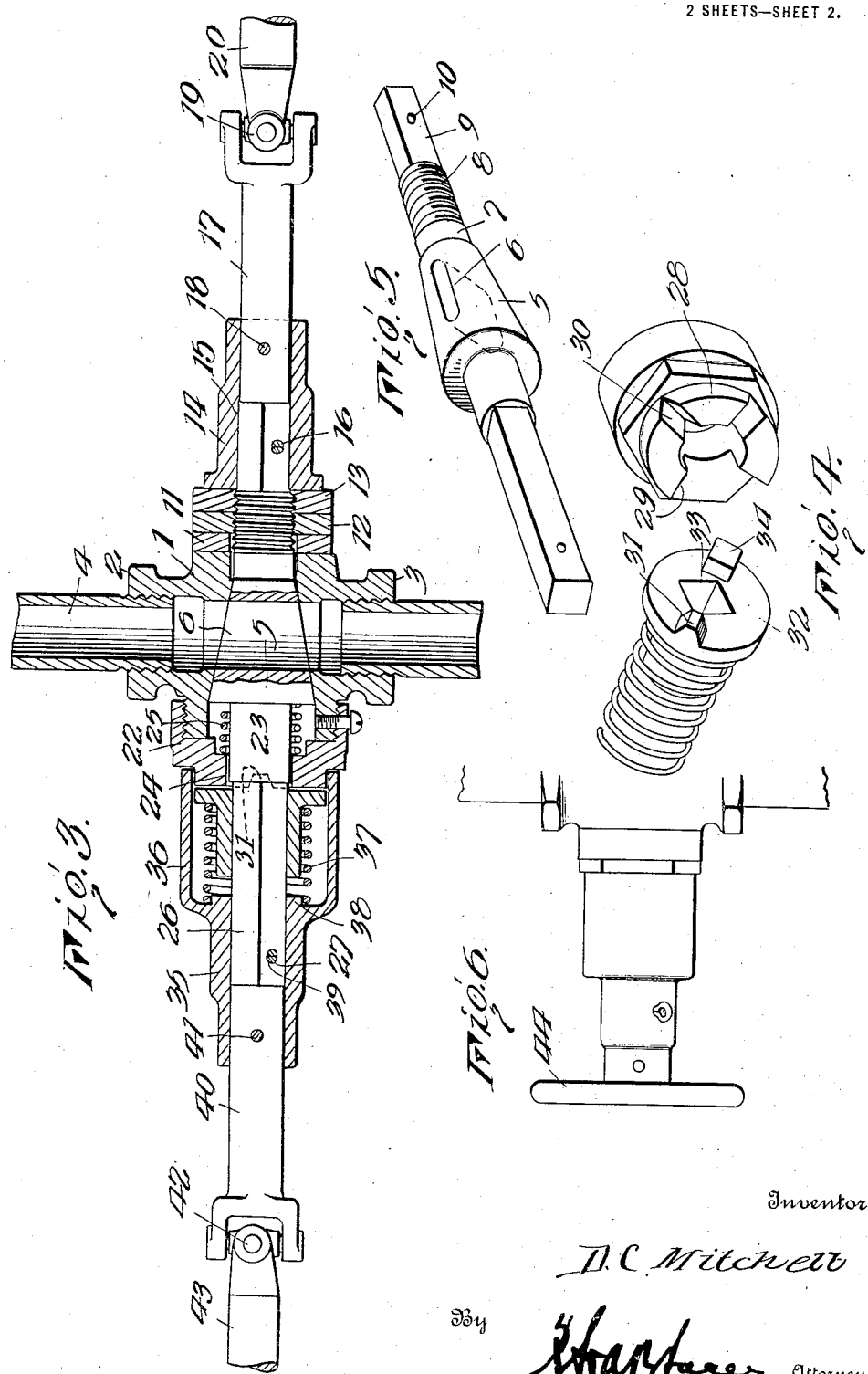

UNITED STATES PATENT OFFICE.

DAVID C. MITCHELL, OF MONONGAHELA, PENNSYLVANIA.

TRAIN-PIPE VALVE.

1,240,472.   Specification of Letters Patent.   Patented Sept. 18, 1917.

Application filed November 2, 1916. Serial No. 129,165.

*To all whom it may concern:*

Be it known that I, DAVID C. MITCHELL, a citizen of the United States, residing at Monongahela, in the county of Washington and State of Pennsylvania, have invented certain new and useful Improvements in Train-Pipe Valves, of which the following is a specification.

This invention relates to train pipe valves and is designed more particularly as an improvement upon the valve forming the subject-matter of my Patent 1,224,176, dated Nov. 7, 1916. It is one aim of the present invention to provide a more substantial connection between the rotating plug of the valve and the operating rod for the said plug, which connection will not be likely to be disturbed because of shocks to which the valve is subjected.

Another aim of the invention is to provide novel means for preventing clogging or fouling of the elements of the device provided for holding the valve in open or closed position.

Another aim of the invention is to provide a valve of this class embodying means for holding the valve in open or closed position and which means will be so constructed and arranged as to be compact and capable of withstanding the shocks and jars to which the valve is subjected under working conditions.

In the accompanying drawings:

Fig. 3 is a vertical longitudinal sectional view through the valve;

Fig. 4 is a group perspective view of certain parts of the device provided for holding the valve in open or closed position;

Fig. 5 is a perspective view of the valve proper removed from its valve casing;

Fig. 6 is a view in elevation illustrating a slight modification of the invention.

Figure 1:
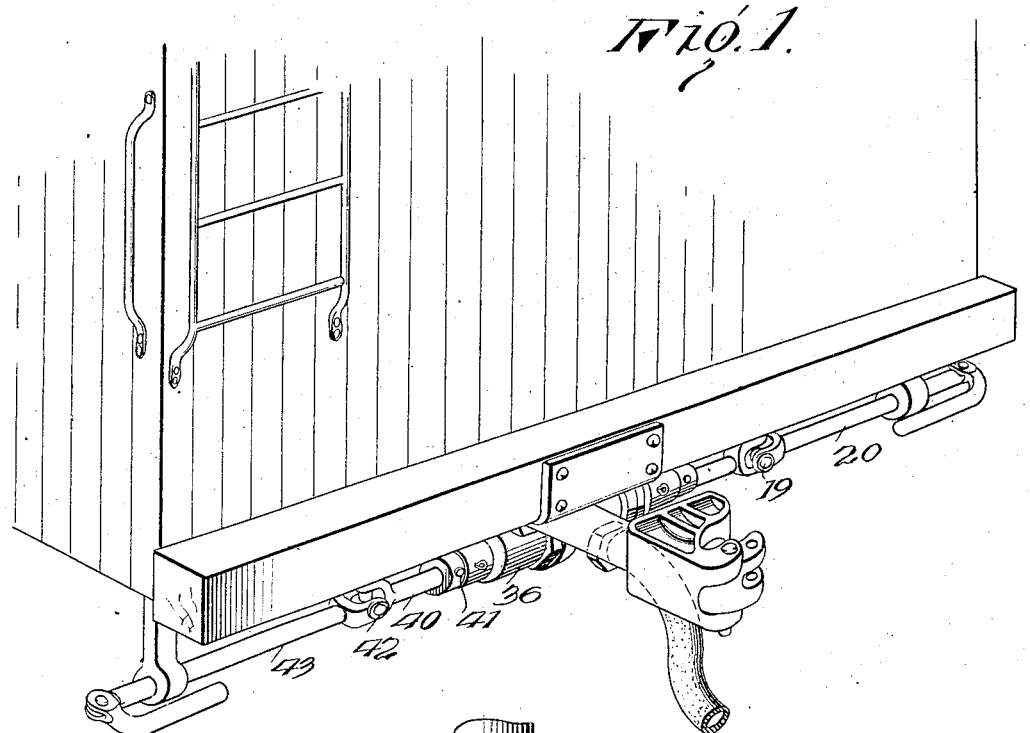
Figure 1 is a perspective view of the valve embodying the present invention applied.
Figure 2:
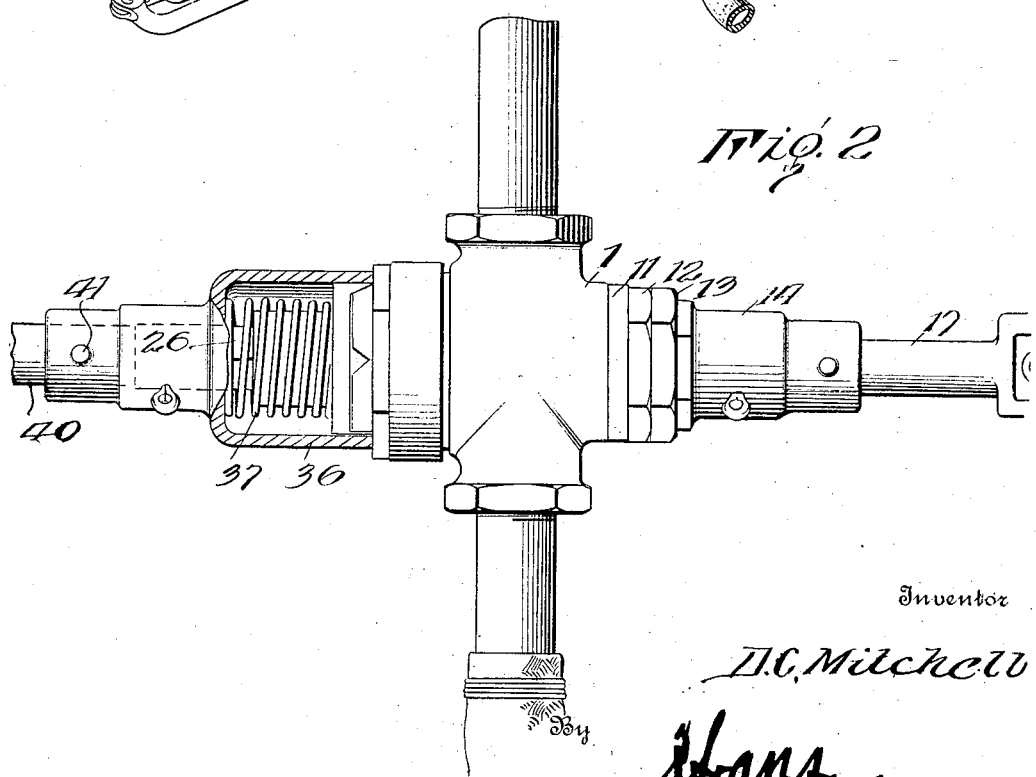
Fig. 2 is a view, partly in elevation and partly in longitudinal section, illustrating the said valve in detail.

In the accompanying drawings the valve casing is indicated in general by the numeral 1 and is of the usual cruci-form shape and has its oppositely located branches 2 and 3 interiorly threaded to receive the ends of the sections of the train pipe, indicated by the numeral 4. The numeral 5 indicates the tapered rotating plug which constitutes the valve proper and which is rotatably fitted within the casing 1 and provided with the usual port 6 for the passage of air when the valve is in open position. At its minor end the valve body 5 is formed with an integral axially extending stem 7, having a threaded portion which is indicated by the numeral 8 and beyond its threaded portion is squared, as indicated by the numeral 9 and formed in its said squared portion with a transverse opening 10. Fitted on to the threaded portion 8 of the stem 7 is a washer 11 and this washer bears against that end of the casing 1 through which the said stem 7 extends, as clearly shown in Fig. 3 of the drawings, a nut 12 and a jam nut 13 being threaded upon the said portion of the stem and the former bearing against the said washer. The numeral 14 indicates a sleeve, the bore of which is squared at one end, as indicated at 15, so as to fit the squared portion 9 of the stem 7 and a pin 16 is fitted through openings formed at diametrically opposite points in the sleeve 14 and through the said opening 10 for the purpose of connecting the sleeve with the stem 7. The bore throughout the remainder of its length may be of cylindrical or rectangular form either as desired and fitted therein is a short rod section, indicated by the numeral 17, the section being preferably secured in place by a transverse pin 18. Connected with the said rod section 17 by a universal joint 19 is one of two operating rods, indicated by the numeral 20, provided for the operation of the valve and this rod extends beneath the car body upon which the valve is mounted and at its outer end is provided with a suitable handle 21 located at the side of the said car body in position where it may be conveniently grasped for the purpose of rotating the rod to adjust the valve to open or closed position.

A cap 22 is removably threaded on to that end of the valve casing opposite the end through which the stem 7 projects and the valve is provided at its corresponding end or, in other words, at its major end, with a stem 23 in axial alinement with the said valve body and with the stem 7 and the said stem 23 projects through an opening 24 formed in the cap 22, and a spring 25 is fitted upon the stem 23 and bears at one end against the inner side of the said cap and at its other end against the major end of the valve body. The outer portion of the stem 23 is squared, as indicated by the numeral 26 and formed with an opening 27. A cap 22 is formed upon its outer face and surrounding the opening 24, with an approximately semi-circular boss 28, the ends of which constitute abutment shoulders 29 for a purpose to be presently explained. The boss 28 is formed at suitable intervals with notches 30 and adapted to seat interchangeably in these notches is a beveled lug 31 formed upon the end of a sleeve 32 which is provided with a squared bore 33 fitting the squared portion 26 of the valve stem 23. The end of the sleeve 32 is further provided with a lug 34 designed to coact with the shoulders 29 whereby to limit the rotative movement of the valve and it will be understood that when the lug 31 is in engagement in one of the notches 30 the valve will be in open position and will be so held that when the said lug is in engagement in the other one of the notches the valve will be in closed position and will be so held. A sleeve 35 is provided with a squared bore and this sleeve is fitted on to the squared portion 26 of the valve stem 23. At one end the sleeve is formed with a cylindrical extension 36 which interiorly is of a diameter to more or less exacting receive the boss 28 in the manner clearly shown in Fig. 3 of the drawings, the outer end of the extension 36 completely surrounding the said boss and having its edge located relatively close to the face of the cap 22. A spring 37 is fitted upon the sleeve 32 and bears at one end against the enlarged end of the said sleeve and is centered at its other end by a boss 38 formed upon the inner end of the extension 36. It will be understood that normally the spring tends to move the sleeve 32 in the direction of the cap 22 and therefore the lug 31 will be maintained in engagement in one or the other of the notches 30, as the case may be. However, when the valve stem 23 is rotated the lug 31 will ride out of the notch in which it is at that time seated and in doing so the sleeve 32 will be moved away from the cap 22 against the tension of the spring 37. A pin 39 is fitted through the sleeve 35 and through the opening 27 and serves to secure the sleeve in place upon the valve stem. The sleeve projects beyond the end of the portion 26 of the valve stem 23 and the said projecting portion constitutes a socket in which is fitted a relatively short rod section 40 secured in place by a transverse pin 41. The said rod section 40 corresponds to the rod section 17 previously described and has connected with it by a universal joint 42, an operating rod 43 corresponding to the rod 20. In that form of the invention shown in Fig. 6 of the drawings, instead of operating the valve through the medium of a rod section corresponding to the section 40, a hand wheel 44 is formed or secured upon the end of the sleeve 35 and may be grasped for the purpose of rotating said sleeve whereby to impart rotary motion to the valve stem 23. It will be understood, of course, that while the valve embodying the present invention is designed primarily for use in connection with a train pipe, it may be put to various other uses if desired. It will further be understood that the extension 36 of the sleeve 35 prevents injury to the spring 37 and prevents clogging or fouling of the notches 30 which would, of course, prevent proper seating of the lug 31 in the open and closed positions of the valve.

Having thus described the invention, what is claimed as new is:

1. In a valve of the class described, a casing, a valve plug mounted for turning movement in the casing and having a stem, a cap upon one end of the casing through which the stem extends, a member slidably fitting the valve stem and rotatable therewith, coacting means upon the said cap and the said member for holding the valve in positions of adjustment, a member fixed upon the valve stem, a spring surrounding the valve stem and bearing between the first and last mentioned members whereby to hold the first-mentioned member yieldably in coöperative relation to the said cap, and means carried by the last-mentioned member inclosing the said spring.

2. In a valve of the class described, a casing, a valve plug mounted for turning movement in the casing and having a stem, a member slidably fitted on the stem and rotatable therewith, a locking element fixed with relation to the casing, a locking element fixed with relation to the said member, a member fixed upon the valve stem, a spring bearing against the last-mentioned member and also against the first-mentioned member and serving to hold the first-mentioned member with the locking elements in coöperative engagement, and means carried by the last-mentioned member surrounding and inclosing the said springs and the said locking elements.

3. In a valve of the class described, a casing, a cap upon one end of the casing, a valve plug mounted for turning movement in the casing and having a stem extending through the cap, an approximately circular boss upon the face of the cap having seating notches, a member slidably fitted upon the valve stem and having a lug arranged for engagement interchangeably in said notches, a member fixed upon the valve stem, a spring bearing between the first and last mentioned members, and a cylindrical extension upon the last mentioned member housing the said spring and the first mentioned member and receiving and housing within its end the boss upon the said cap.

In testimony whereof I affix my signature.

DAVID C. MITCHELL. [L. S.]

Copies of this patent may be obtained for five cents each, by addressing the "Commissioner of Patents, Washington, D. C."